United States Patent [19]

Muramatsu et al.

[11] 4,416,368

[45] Nov. 22, 1983

[54] CONVEYOR MECHANISM FOR CYLINDRICAL ARTICLES

[75] Inventors: Tsuyoshi Muramatsu; Shuji Hara, both of Hiratsuka, Japan

[73] Assignee: The Japan Tobacco & Salt Public Corporation, Hiratsuka, Japan

[21] Appl. No.: 400,055

[22] Filed: Jul. 20, 1982

Related U.S. Application Data

[63] Continuation of Ser. No. 220,185, Dec. 23, 1980, abandoned, which is a continuation of Ser. No. 49,224, Jun. 18, 1979, abandoned.

[51] Int. Cl.³ .............................................. B65G 15/14
[52] U.S. Cl. ................................. 198/604; 198/607; 198/626; 198/715
[58] Field of Search ............... 198/604, 607, 626, 678, 198/688, 698, 699, 715, 847, 849, 860, 861, 347

[56] References Cited

U.S. PATENT DOCUMENTS

| 463,110 | 11/1891 | Dryden | 198/688 |
|---|---|---|---|
| 2,114,180 | 4/1938 | Guba | 198/849 |
| 2,504,339 | 4/1950 | Mariani | 198/678 |
| 3,280,961 | 10/1966 | McCombie | 198/604 |
| 3,502,198 | 3/1970 | Loye | 198/715 |
| 3,549,003 | 12/1970 | Jacobson | 198/861 |
| 3,581,878 | 6/1971 | Jacobson | 198/861 |
| 3,788,453 | 1/1974 | Varney | 198/715 |
| 4,042,094 | 8/1977 | Schmermund | 198/347 |
| 4,120,391 | 10/1978 | Molins et al. | 198/607 |

FOREIGN PATENT DOCUMENTS 583761 1/1925 France ............................... 198/626

Primary Examiner—Joseph E. Valenza
Attorney, Agent, or Firm—Lackenbach, Siegel, Marzullo, Presta & Aronson

[57] ABSTRACT

A conveyor mechanism for transferring cylindrical articles, such as, cigarettes embodies a single belt conveyor which does the conveying from a lower level to a higher level. The surface used for conveyance has a curved portion unlike belt conveyors in general use and a plurality of pins project from at least one side of the belt in parallel relation to each other. At the curved section, these pins are held by a suitable means such that the belt maintains the curvature. Cigarettes or other cylindrical objects are fed by the internal surface of the curving belt and an auxiliary belt conveyor.

11 Claims, 16 Drawing Figures

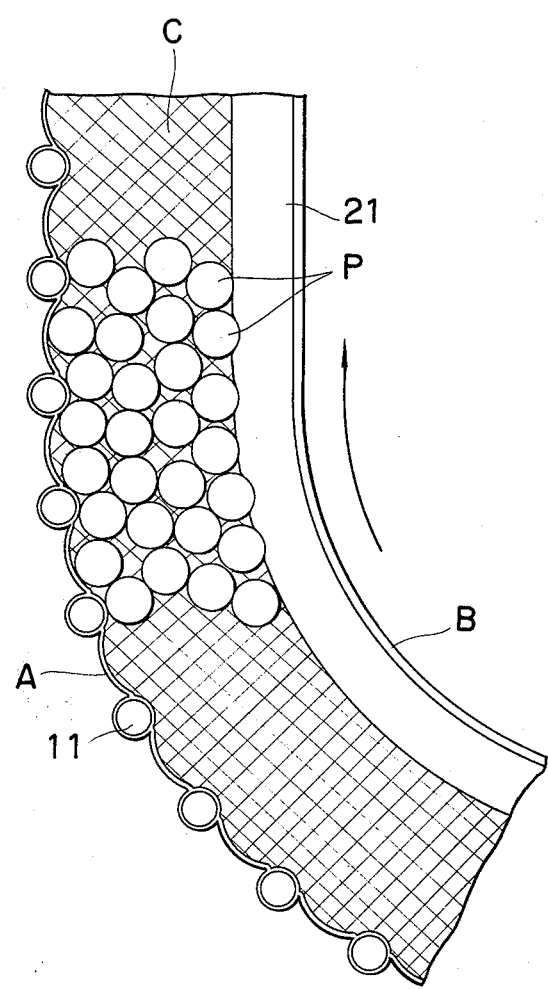

CONVEYOR MECHANISM FOR CYLINDRICAL ARTICLES

This is a continuation of application Ser. No. 220,185, filed Dec. 23, 1980, which is in turn a continuation of U.S. Ser. No. 49,224; filed June 18, 1979, both of which are abandoned.

BACKGROUND OF THE INVENTION

The present invention relates to a conveyor mechanism for moving a stratified mass of cigarettes or like package of cylindrical articles from a first plane for conveyance to a third plane of a different level via a second plane extending vertically from the first to the third by means of a series of endless conveyor belts.

For the supply of cigarettes from a cigarette making machine to a cigarette packing machine, a large amount of cigarettes must be moved from the output level of the cigarette making machine upwardly to the input or hopper level of the packing machine.

Systems for conveying a layer of cigarettes from a first level to a second level are disclosed in U.S. Pat. No. 3,529,713 (1970), Japanese Patent Publication No. 50-10960 (1975), and Japanese Patent Application Provisional Publication No. 53-75398 (1978). These known systems cannot, however, preclude a difficult installation of a single endless conveyor belt throughout the length of a winding path for conveyance, which may lead from a horizontally extending first plane to a horizontal third plane via a vertical second plane. For this reason, they commonly employ a plurality of belt conveyors for the transfer of articles from one level to another. This type of arrangement is not fully acceptable because the articles are likely to suffer damage when changing from one belt conveyor to another as during transition from a horizontal travel to an elevation and because such shock tends to disturb the mutual alignment of the articles in conveyance.

Furthermore, conventional mechanisms inclusive of the ones discussed above have belt support rollers held exposed to opposite sides of the conveyor belts. This situation may be dangerous for manual removal of inferior articles prepared by a preceding machine and/or misaligned articles.

SUMMARY OF THE INVENTION

It is an object of the present invention to provide a conveyor mechanism for cylindrical articles such as cigarettes, which mechanism feeds the articles smoothly from one position to another position of a different level. In order to achieve this object, the conveyor mechanism includes a first endless belt carrying therewith a plurality of spaced support pins each extending perpendicularly to an intended direction of conveyance in parallel with the conveying surface of the belt and projecting from the belt. A plurality of endless drive chains extend in parallel with the endless belt on at least one side of the endless belt and with which the support pins are connected. Sprocket wheels and guide rails function in combination to support the drive chains, such that the endless belt forms a horizontally extending first surface, and a second surface leading from the first surface to a higher level. A second endless belt spaced from and parallel to the second surface of the first endless belt defines a substantially vertical conveyance path in cooperation with the first endless belt.

Another object of the present invention is to provide a conveyor mechanism which promotes safe manual operation by precluding the possibility of an operator's hands from being entangled in the belt and pulley during removal of misaligned articles or inferior articles prepared by a preceding processing station. This object is achieved by connecting the support pins carried on the first endless belt to a plurality of endless drive chains extending on one side of and in parallel to the first belt and, thereby allowing no drive members to be located on the other side of the first belt.

A further object of the present invention is to provide a conveyor mechanism which ensures the smooth conveyance of cylindrical articles through a substantially vertical passage. This object may be accomplished by forming a plurality of ridges in those surface portions of the first endless belt which are connected with the support pins so that a plurality of articles cooperate therewith to shape a stable bridge in the vertical path.

Still another object of the present invention is to provide a conveyor mechanism which avoids accidental entry of cylindrical articles into a gap between a chute and the first endless belt in a terminal section of the conveyance path. This objective may be effected generally by making undulations on a conveying surface deeper during vertical conveyance and making the conveyance surface flat where the terminal end portion of conveyance leads to, for example, a conveyor of the subsequent processing station. In a preferred embodiment of the invention, a conveyor mechanism includes the support pins on the first endless belt. These pins are connected with the drive chains in such a manner as to cause the first belt to slacken between neighboring pins. The first belt bears ridges on its conveying surface with or without the addition of a flexible member, thereby contributing to the reduction of pressure applied to the articles conveyed vertically by the first belt and promoting the bridging of the articles. A belt straightening member is located at the terminal portion of conveyance to back up the slakened portion of the first belt and straighten it for preventing it from being caught between a pulley and a chute provided at the final section of conveyance.

Yet another object of the present invention is to provide a conveyor mechanism which facilitates the smooth travel of cylindrical articles through a curved transitional section from the first conveying plane to the second conveying plane by permitting the curved surface to be shaped and dimensioned with ease. This objective is achieved by regulating the configuration of the transitional section by means of a sprocket wheel adapted to support the drive chains in said section which are mounted on a common shaft together with a pulley for supporting the lower end of the second endless belt.

BRIEF DESCRIPTION OF THE DRAWINGS

The present invention will be further described hereinafter in connection with the accompanying drawings, in which:

FIG. 16 is a fragmentary view showing the details of a vertical path according to another embodiment of the invention.

DESCRIPTION OF THE PREFERRED EMBODIMENTS

Figure 1:
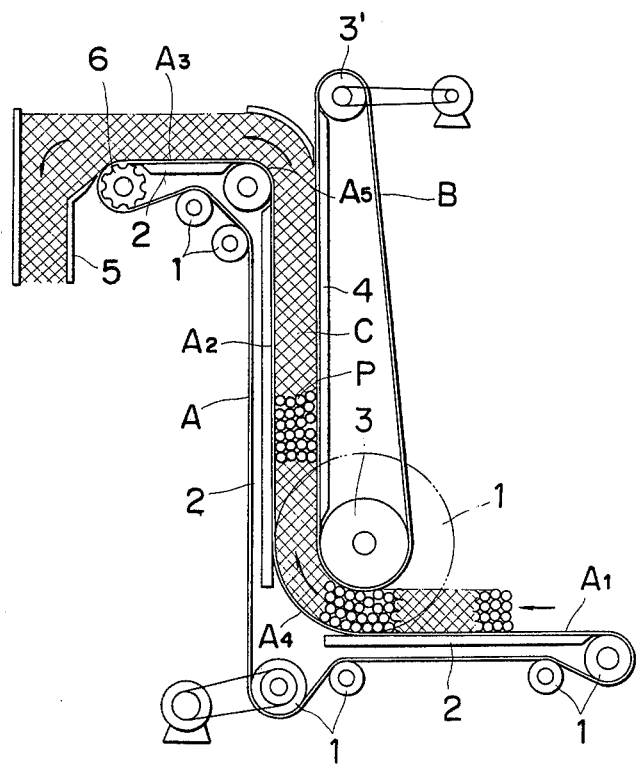
FIG. 1 schematically illustrates the overall arrangement of a conveyor mechanism according to the present invention.

Referring to FIG. 1, a conveyor mechanism according to the present invention is shown to include a first endless belt A carrying a plurality of spaced support pins arranged perpendicularly to the intended direction of transfer and in parallel with the conveying surface. Projecting laterally from the belt A, the support pins are connected with a plurality of endless drive chains which extend on at least one side of and in parallel relation to the belt A. A number of sprocket wheels 1 and guide rails 2 support the drive chains such that the driven belt A defines a first plane section $A_1$ extending in a horizontal plane, a third conveying plane section $A_3$ extending horizontally yet different in level from the first plane section $A_1$ and a second plane section $A_2$ leading substantially vertically from the first plane section $A_1$ to the third plane section $A_3$.

In a transitional section $A_4$ from the first plane section $A_1$ to the second plane section $A_2$ and a transitional section $A_5$ from the second plane section $A_2$ to the third plane section $A_3$, the belt A moves along curved paths the curvatures of which are defined by the sprockets 1 positioned therein.

A second endless belt B is passed over lower and upper pulleys 3 and 3' for cooperation with the first belt A in conveying intended cylindrical articles. The left-hand or upward flight of the belt B is in spaced parallel relation to its confronting second plane section $A_2$ of the belt A while being supported by a guide plate 4.

The third plane section $A_3$ of the belt A is contiguous with a chute 5 at its end portion where the conveyance terminates. A belt straightening member 6 engages the back of the belt A and is rotatable about an axis adjacent to or, preferably, common to the axis of rotation of one sprocket wheel (not shown) positioned at the above-mentioned end portion of the conveyance path.

Figure 2:
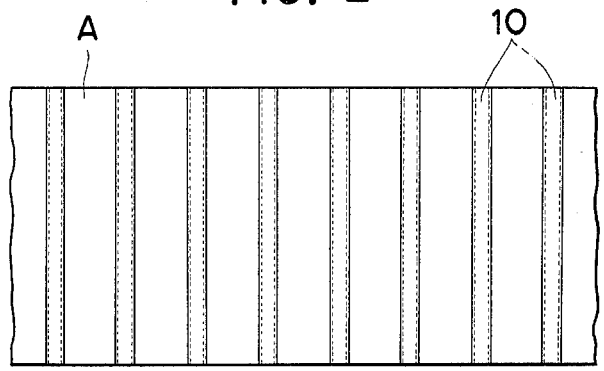
FIG. 2 shows in a fragmentary plan view an example of a first conveyor belt used in the arrangement of FIG. 1.
Figure 3:
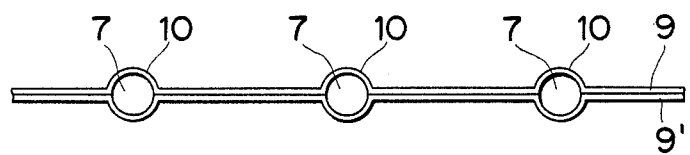
FIG. 3 is a side elevational view of the conveyor belt shown in FIG. 2.

As viewed in FIGS. 2 and 3, the first endless belt A is made of a flexible material and has parallel equidistant bores extending perpendicularly to the direction of conveyance. More specifically, the belt A comprises upper and lower strips 9 and 9' adhered to each other and equally spaced pipes held in parallel between the strips 9 and 9' and right-angled relative to the direction of travel of the belt. Ridges 10 having a substantially semicircular cross-section thus traverse the belt A along the respective parallel pipes. The pipes may be removed from the belt A after moulding the latter, thereby providing the through bores.

Figure 4:
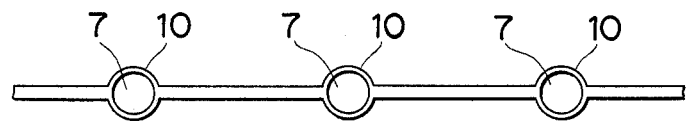
FIGS. 4, 5 and 6 are side elevational views representing other examples of the conveyor belt.

In an alternative configuration, as best shown in FIG. 4, the first endless belt A may be comprised of a single strip of webbing woven to define the parallel equidistant bores 7 and therefore the semicircular ridges 10.

Figure 5:
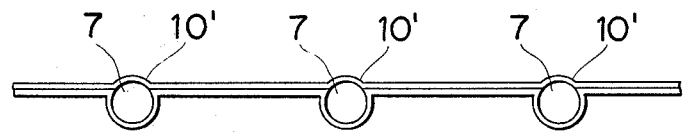
Figure 6:
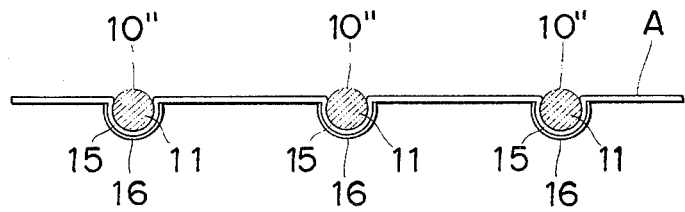
Figure 7:
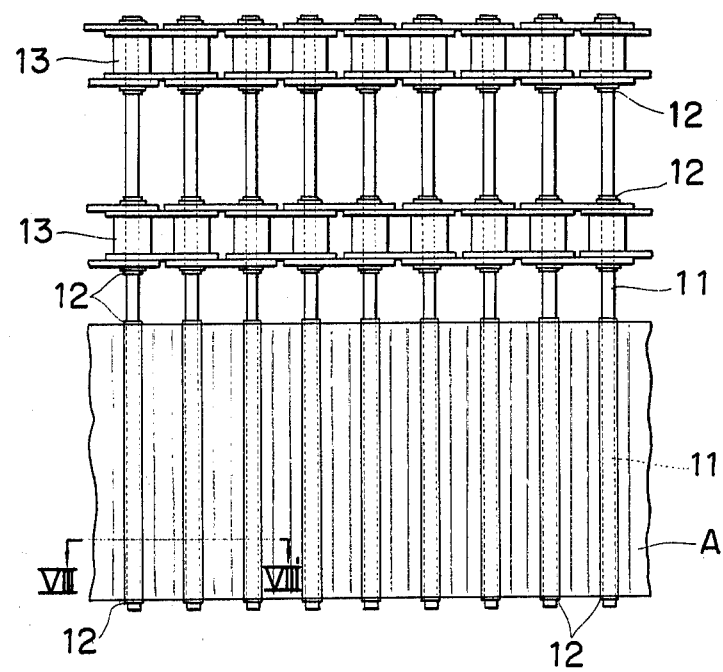
FIG. 7 is an exploded plan view of a belt, pin and chain assembly.

Turning to FIG. 7, each of the bores 7 in the first belt A receives therein a pin 11 whose axial dimension is larger than the width of the belt. The pins 11 are turnable within the corresponding bores 7 and protrude a substantial common length from one lateral edge of the belt A. As shown in FIG. 5, the pins 11 may be positioned offset relative to the belt A to form ridges 10' on the belt surface with a relatively small amount of projection. If desired, ridges 10'' may be defined directly by the peripheries of the pins 11. This is achieved by wrapping the pins 11 in part 15 of the belt A and embracing the outer peripheries of the wrapping part 15 with resilient split annular members 16 to fix the pins in place as viewed in FIG. 6.

Figure 8:
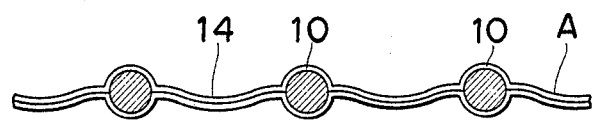
FIG. 8 is a cross-sectional view taken along the line VIII—VIII' of FIG. 7.
Figure 9:
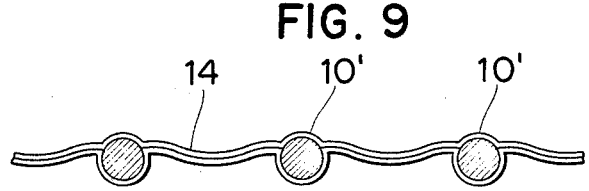
FIGS. 9 and 10 show in cross-section, assembled states of the belts of FIGS. 5 and 6 relative to the chains.
Figure 10:
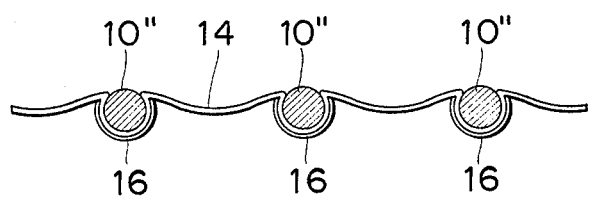

Snap rings 12 are mounted to the end portions of the pins 11 which protrude beyond the other lateral edge of the first belt A. The relatively long outward extensions of the pins 11 are connected together to two parallel drive chains 13 while two neighboring extensions are kept from each other at a spacing smaller than the distance between two neighboring bores 7 in the stretched belt A. It will therefore be understood that, between neighboring pins 11, the belt A is slack as indicated by the numeral 14 in FIGS. 8, 9 and 10.

The pins 11 in the above arrangement are held fixed in place by snap rings 12 such that the drive chains 13 maintain a given spacing therebetween and extend in parallel to the direction of conveyance. It is to be noted that drive chains may also be connected and supported on both sides of the belt A if the belt A has a relatively large width and/or if operator's access to the flowing articles for any purpose is unnecessary.

A single drive chain can replace plural drive chains 13 provided the drive chain is wide enough to hold the pins 11 firmly.

Figure 11:
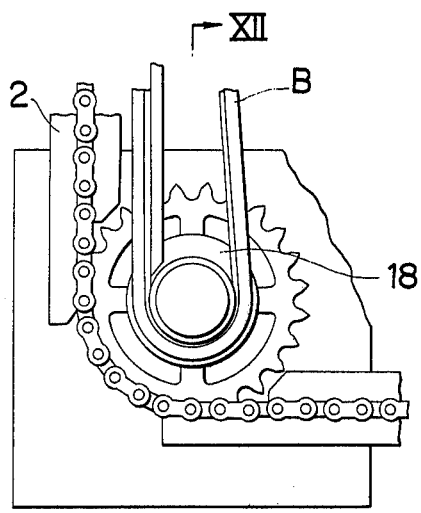
FIG. 11 is a fragmentary view in detail showing a chain support arrangement in a transitional section from a first plane section of a belt conveyor to a second plane section.
Figure 12:
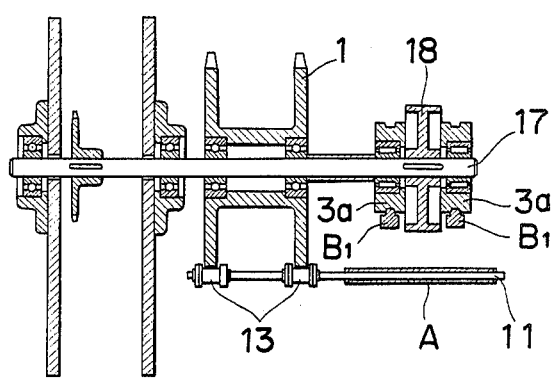
FIG. 12 is a cross-sectional view taken along the line XII—XII' of FIG. 11.

FIGS. 11 and 12 illustrate a structure concerning the second endless belt B. As shown, two lower pulleys $3a$, $3a$ are free to rotate on a shaft 17 which also carries thereon the sprocket wheel 1 adapted to regulate the transitional section $A_4$ of the first belt A. Two narrow endless belts $B_1$ are passed over the lower pulleys $3a$ and the upper pulley 3'. Interposed between the pulleys $3a$ and fixed to the shaft 17 is a roller 18 having a diameter larger than the diameter of the belt curvature. With this arrangement, the belt B will be driven by the upper pulley 3' to move at the same speed as the first belt A whereas the roller 18 on the shaft 17 will be driven for rotation at a peripheral speed lower than that of the belt B.

It will be appreciated that mounting the sprocket 1 associated with the belt A and the pulley 3 associated with the belt B commonly on the shaft 17 facilitates the configuration of the curving section $A_4$, which has conventionally been considered the most difficult in the design of such a transfer path. The roller 18 on the other hand serves the function of a resistance member in connection with the second belt B disposed inwardly in the transitional section $A_4$. Consequently, cigarettes or like cylindrical articles P can be advanced as a uniformly stratified mass into the substantially vertical path C defined between the first and second belts A and B.

Figure 13:
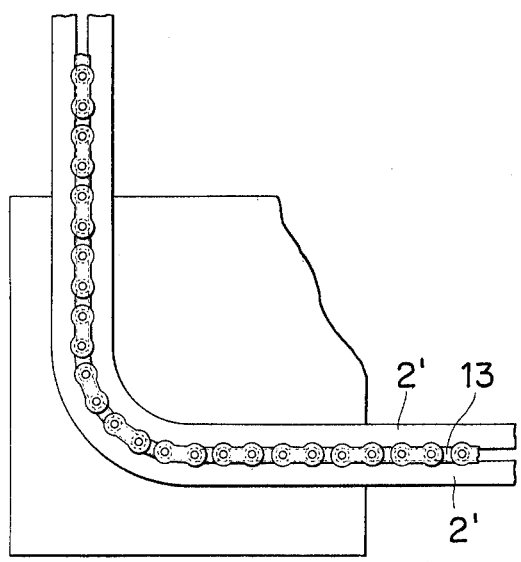
FIG. 13 is another fragmentary view depicting an alternative to the chain support arrangement in the transitional section.

A modified arrangement of the transitional section $A_4$ from the first belt plane section $A_1$ to the second plane section is depicted in FIG. 13. Employed for this modification is a generally arcuate guide rail 2' which engages the drive chains 13 to replace the function of the sprocket 1.

Figure 14:
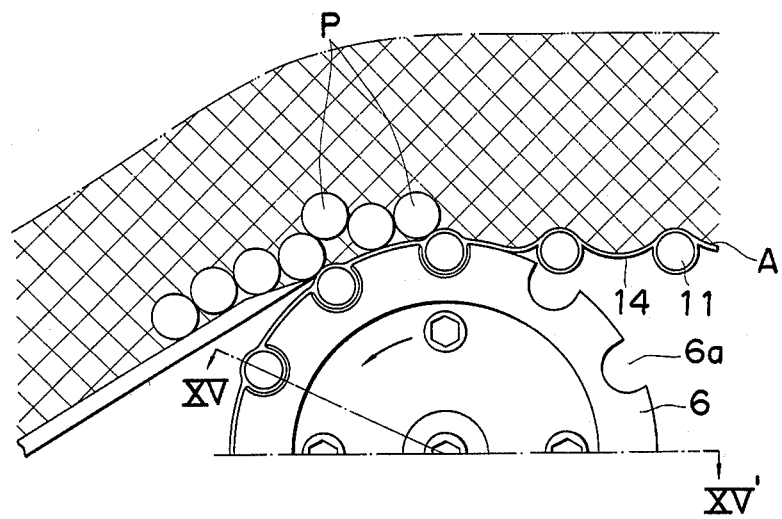
FIG. 14 is a fragmentary side elevational view presenting the details of a slackened belt straightening member.
Figure 15:
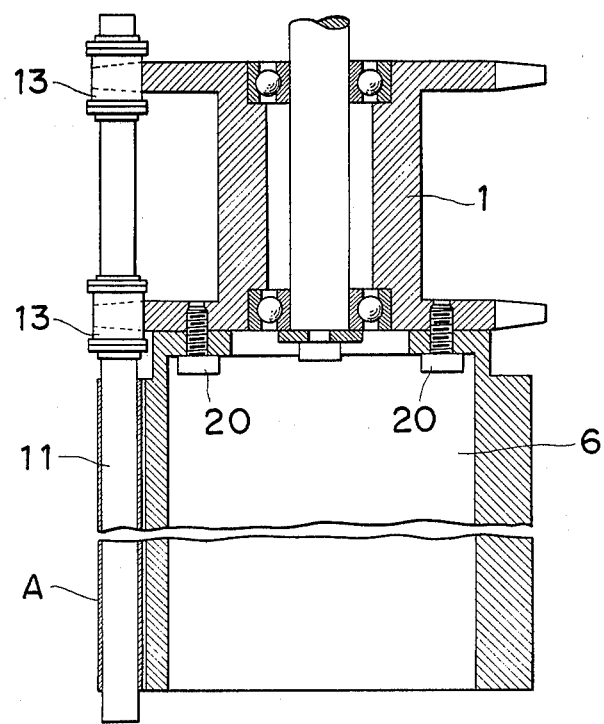
FIG. 15 is a cross-sectional view taken along the line XV—XV' of FIG. 14.

Referring to FIGS. 14 and 15, the belt straightening member 6 taking the form of a roller disc is rigidly mounted by bolts 20 coaxially to the sprocket 1 located in the end-of-transfer portion of the first belt and rotated in synchronism with the speed of belt A. The roller disc 6 has a number of recesses 6a in equally spaced locations along its circumference; each recess 6a is provided with dimensions large enough to accommodate the ridge on the first belt A created by the pins 11. The arc length between the center lines of two neighboring recesses is substantially the same as the distance between the centers of two neighboring ridges of the stretched belt A. When the pins 11 provided on the moving belt A and interconnected by the chains 13 are brought into the recesses 6a of the roller disc 6, the latter will remove the slack of the belt between neighboring pins 11 and thereby make the belt surface flat in the end portion of the conveyance path. Hence, the roller disc 6 safely avoids accidental entry of the articles P such as cigarettes into the gap between the chute 5 and belt A.

In another embodiment shown in FIG. 16, a flexible sheet 21 formed of sponge for example is carried integrally on that surface of the second belt B which confronts the first belt A. Due to its elasticity, the sheet 21 will permit the cylindrical articles P to push themselves slightly in the sheet and thus be supported positively by the belt surface. This, in combination with the ridges 10 on the first belt A, will promote stable transfer of articles through the vertical path C by causing the articles to form a stable bridge in combination.

In operation, cigarettes for example supplied from a cigarette rolling machine reach the first surface $A_1$ of the first belt A while maintaining a predetermined thickness as a layer. The cigarettes are then elevated to the third plane section $A_3$ through the vertical path C defined between the second plane section $A_2$ and second belt B on account of their bridging formation and friction with the confronting belt surfaces. From the third surface $A_3$ the cigarettes are advanced to the following processing station, e.g. a hopper of a cigarette packing machine.

In the transition from the conveyor mechanism to the subsequent processing station, the recesses 6a of the belt straightening roller disc 6 serve to urge the slack portions of the first belt A upwardly into substantially flush relation with the tops of the pins 11. It will therefore be seen that the cigarettes are conveyed easily from the conveyor mechanism into the chute 5.

In summary, a conveyor mechanism according to the present invention achieves a very simple structure and a ready application to an intricate transfer system with repeated elevating and lowering inasmuch as its major component is a single endless belt travelling over the entire conveyance path.

In the functional aspect, the conveyance path involves no points of disconnection so that conveyed articles are free from shocks which would otherwise be applied at a point of transfer from one belt to another.

Furthermore, since it is only the conveyor belts that present themselves to the front of the mechanism and all the drive and guide members are installed at the back of the mechanism, the articles in conveyance can be observed and handled with ease and safety.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A conveyor mechanism for transferring cylindrical articles, such as cigarettes, from the lower level to a higher level and through a concavity passage area including:
   an endless backing conveyor belt;
   an upper pulley and a lower pulley supporting said endless backing conveyor belt;
   an endless conveyor belt forming a first plane section extending from about said lower pulley, and a second plane section extending between said lower and upper pulleys in confronting relation to said endless backing conveyor belt;
   a plurality of spaced cylindrical support members transversely extending within said endless conveyor belt perpendicularly to an intended direction of conveyance and projecting from only one side of said endless conveyor belt;
   at least one endless chain extending substantially parallel with said endless conveyor belt on said only one side thereof while retaining said spaced cylindrical support members;
   first chain holding means for supporting said at least one endless chain on said only one side of the endless conveyor belt;
   and second chain holding means for reducing belt slack including a sprocket wheel provided on said only one side of the endless conveyor belt coaxially with said lower pulley and having a diameter larger than that of said lower pulley to support said at least one endless chain such that said endless conveyor belt forms a smooth curved transitional section between said first plane section and said second plane section;
   whereby safe and easy access to articles in conveyance is provided in case of mechanical breakdown from the other side of said endless conveyor belt unobstructed by said at least one endless chain and said chain holding means which permits one to reach for the articles on the conveyor belt without fear of one's hands being caught between said endless conveyor belt and the sprocket arrangement; and whereby the surface of the conveyor belt is precluded from floating in said concavity passage area by the said at least one endless chain and sprocket arrangement.

2. A conveyor mechanism as claimed in claim 1, further including a third plane section extending from about said upper pulley.

3. A conveyor mechanism as claimed in claim 1, wherein said first chain holding means includes guide means extending on said at least one side of said endless conveying means and in substantially parallel relation therewith.

4. A conveyor mechanism as claimed in claim 3, wherein second chain holding means further includes a plurality of sprocket wheels each being mounted on a shaft provided with said lower pulley.

5. A conveyor mechanism as claimed in claim 1, wherein said upper and lower pulleys are positioned on a substantially identical perpendicular.

6. A conveyor mechanism as claimed in claim 1, wherein said first plane section extends substantially horizontally.

7. A conveyor mechanism as claimed in claim 2, wherein at least one of said first plane and third plane sections extends substantially horizontally.

8. A conveyor mechanism as claimed in claim 1, wherein said endless conveying means includes a belt of at least one ply.

9. A conveyor mechanism as claimed in claim 8, wherein said cylindrical support members are arranged at regular intervals.

10. A conveyor mechanism as claimed in claim 9, wherein said belt of said endless conveying means is provided on at least one surface thereof with ridges formed by said cylindrical support members, the chains retaining the support pins at a common interval which is smaller than the spacing between neighboring ones of said ridges in a stretched position of said belt to slacken said belt; and there is further provided additional means for correcting the slack of said belt in a terminal position of conveyance.

11. A conveyor mechanism as claimed in claim 10, wherein said slack correcting means includes a disc rotatable in synchronism with said belt and in engagement with the back of said belt, said disc having on the periphery thereof regularly spaced recesses each being dimensioned large enough to receive said ridge, the length of arc between the center lines of two neighboring recesses being the same as the distance between the centers of two neighboring ridges of the stretched belt.

* * * * *